US010960575B2

(12) United States Patent
Baldauf et al.

(10) Patent No.: US 10,960,575 B2
(45) Date of Patent: Mar. 30, 2021

(54) DEVICE CONFIGURED TO INTERMITTENTLY SUPPLY A LIQUID PLASTIC COMPONENT

(71) Applicant: Henkel AG & Co. KGaA, Düsseldorf (DE)

(72) Inventors: Guenther Baldauf, Hohenweiler (AT); Mario Metzler, Lustenau (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 0 days.

(21) Appl. No.: 15/740,220

(22) PCT Filed: Jun. 24, 2016

(86) PCT No.: PCT/AT2016/050226
§ 371 (c)(1),
(2) Date: Dec. 27, 2017

(87) PCT Pub. No.: WO2017/004635
PCT Pub. Date: Jan. 12, 2017

(65) Prior Publication Data
US 2018/0186033 A1 Jul. 5, 2018

(30) Foreign Application Priority Data

Jul. 3, 2015 (AT) .................................. A 432/2015

(51) Int. Cl.
*B29B 7/74* (2006.01)
*F04B 9/123* (2006.01)
(Continued)

(52) U.S. Cl.
CPC ............ *B29B 7/7409* (2013.01); *B29B 7/748* (2013.01); *B29B 7/7414* (2013.01);
(Continued)

(58) Field of Classification Search
CPC ... B29B 7/7414; B29B 7/7433; B29B 7/7466; B29B 7/748; B29B 7/7485; B29B 7/7409; F04B 9/00; F04B 9/123; F04B 13/00
See application file for complete search history.

(56) References Cited

U.S. PATENT DOCUMENTS 3,184,419 A 5/1965 Merriman
3,627,275 A 12/1971 Gusmer
(Continued)

FOREIGN PATENT DOCUMENTS

| CN | 1175920 | 3/1998 |
|---|---|---|
| DE | 27 43 452 | 3/1978 |

(Continued)

OTHER PUBLICATIONS

International Search Report dated Aug. 30, 2016 in International (PCT) Application No. PCT/AT2016/050226.
(Continued)

*Primary Examiner* — Seyed Masoud Malekzadeh
(74) *Attorney, Agent, or Firm* — Wenderoth, Lind & Ponack, L.L.P.

(57) ABSTRACT

A device includes a source for at least one liquid plastic component, and a metering device. The source is configured to intermittently supply the at least one liquid plastic component for the metering device. A buffer device with a variable buffer volume is between the source and the metering device, and the buffer device is connected to the source via an inlet opening and to the metering device via an outlet opening.

12 Claims, 4 Drawing Sheets

(51) Int. Cl.
 *F04B 9/00* (2006.01)
 *F04B 13/00* (2006.01)
(52) U.S. Cl.
 CPC .......... *B29B 7/7433* (2013.01); *B29B 7/7466* (2013.01); *B29B 7/7485* (2013.01); *F04B 9/00* (2013.01); *F04B 9/123* (2013.01); *F04B 13/00* (2013.01)

(56) References Cited

U.S. PATENT DOCUMENTS

| | | | |
|---|---|---|---|
| 3,692,442 | A | 9/1972 | Gerbert |
| 3,908,862 | A | 9/1975 | Chandra et al. |
| 4,171,191 | A | 10/1979 | Krueger |
| 4,275,172 | A | 6/1981 | Barth et al. |
| 4,307,760 | A | 12/1981 | Häuser |
| 5,462,199 | A * | 10/1995 | Lenhardt ............... B05C 5/001 118/667 |
| 5,551,486 | A * | 9/1996 | Hauser .................. B29C 31/06 141/1 |
| 5,942,258 | A | 8/1999 | Hauser |
| 6,234,355 | B1 * | 5/2001 | Lenhardt ............ B01F 15/0203 222/135 |
| 6,538,040 | B1 | 3/2003 | Okuda et al. |
| 2008/0290543 | A1 | 11/2008 | Okamoto et al. |

FOREIGN PATENT DOCUMENTS

| | | |
|---|---|---|
| DE | 39 13 000 | 12/1989 |
| EP | 2 067 992 | 6/2009 |
| FR | 2 595 121 | 9/1987 |
| GB | 1 503 648 | 3/1978 |
| GB | 1 532 045 | 11/1978 |
| JP | 5-220768 | 8/1993 |
| JP | 6-198152 | 7/1994 |
| JP | 6-297477 | 10/1994 |
| JP | 2001-200877 | 7/2001 |
| KR | 10-1255770 | 4/2013 |
| KR | 10-1338650 | 12/2013 |
| KR | 10-1388650 | 4/2014 |
| RU | 2 142 358 | 12/1999 |
| SU | 987395 | 1/1983 |
| SU | 1260220 | 9/1986 |

OTHER PUBLICATIONS

Search Report dated Feb. 1, 2016 in Austrian Application No. A 432/2015, with English translation.

* cited by examiner

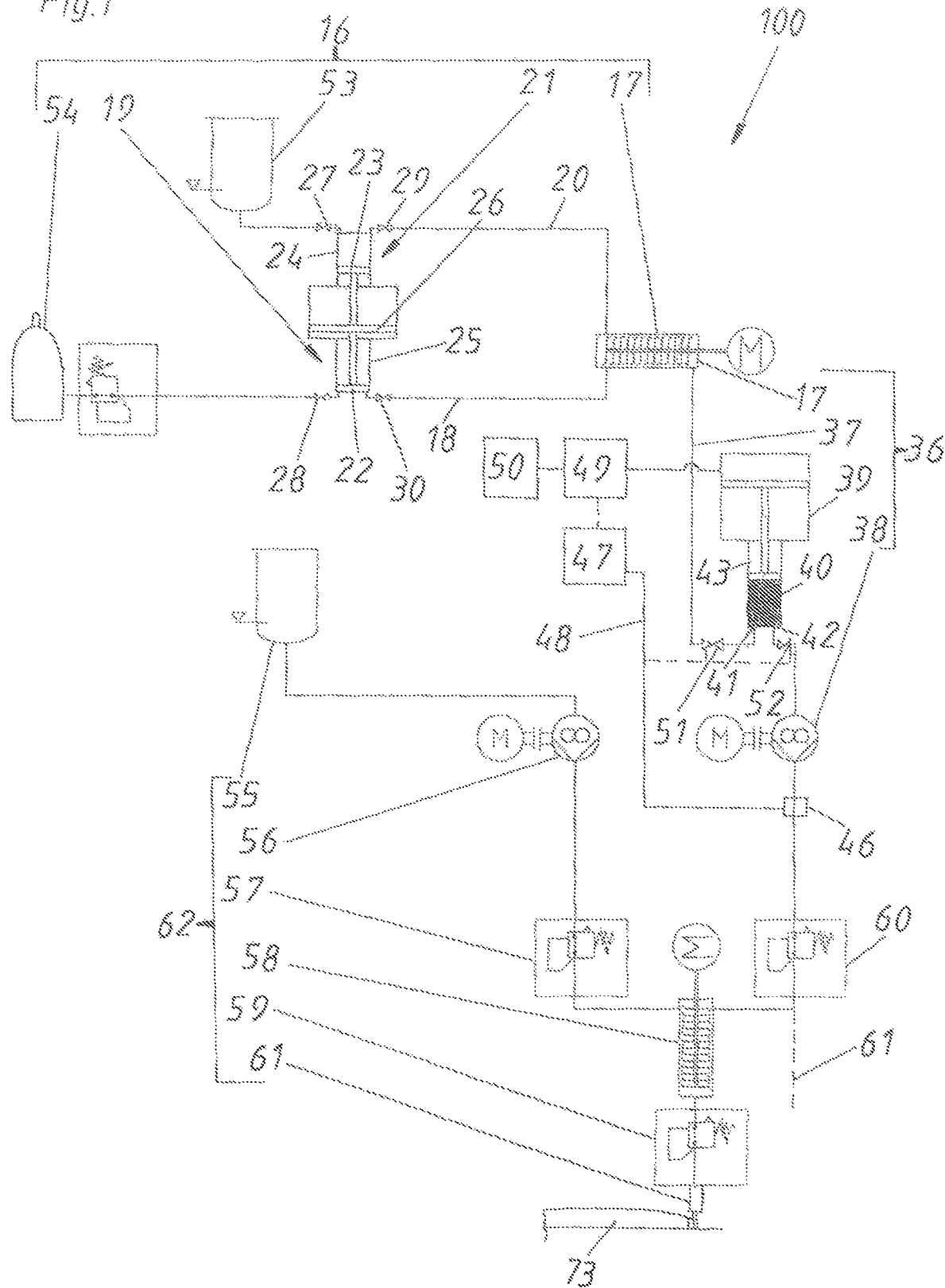

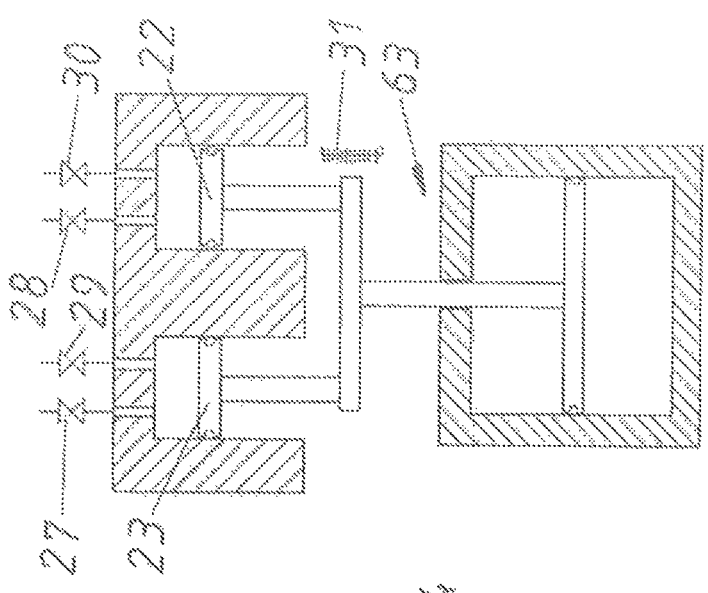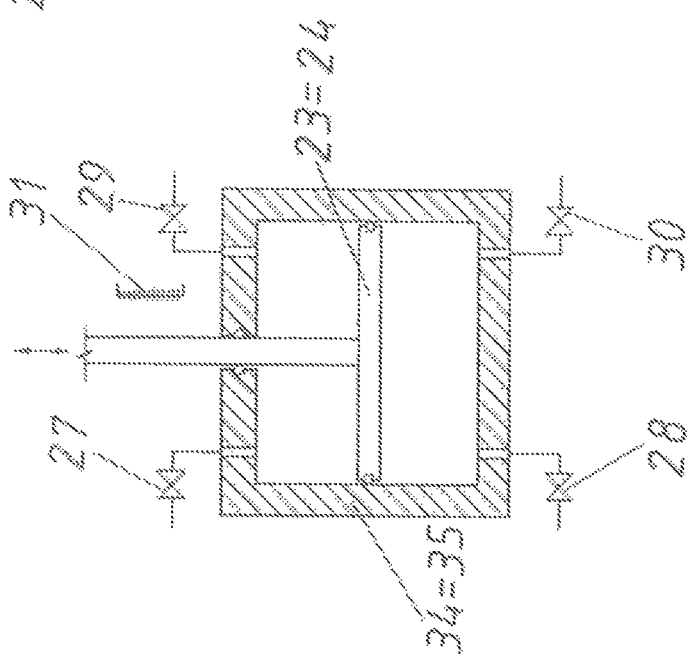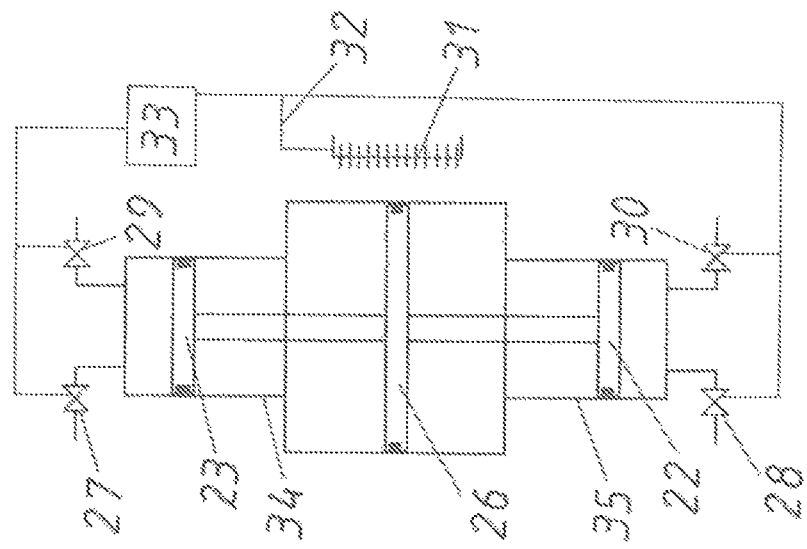

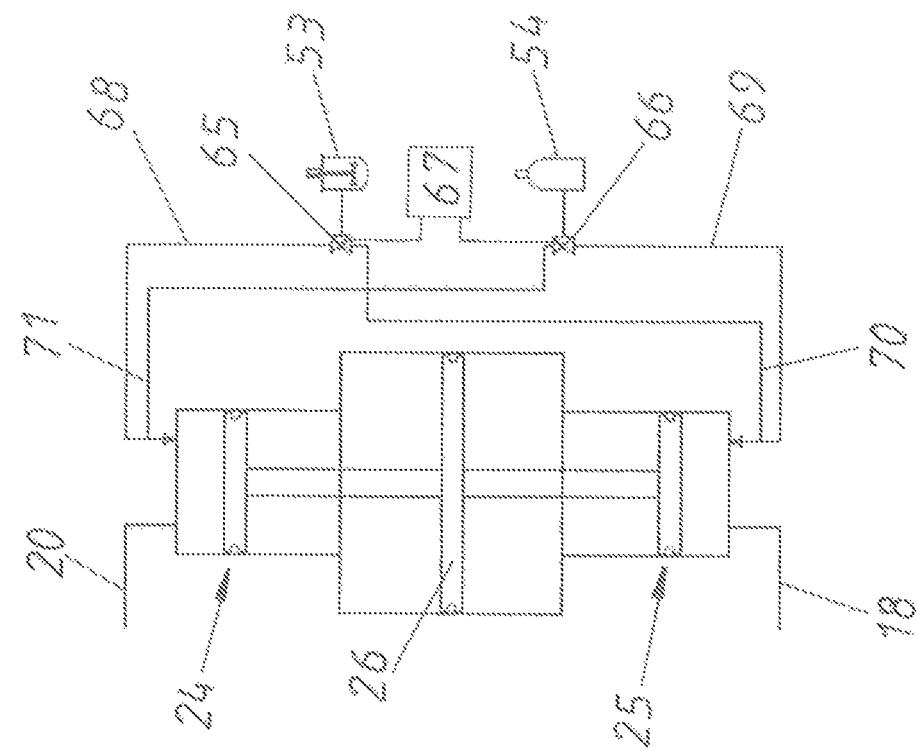
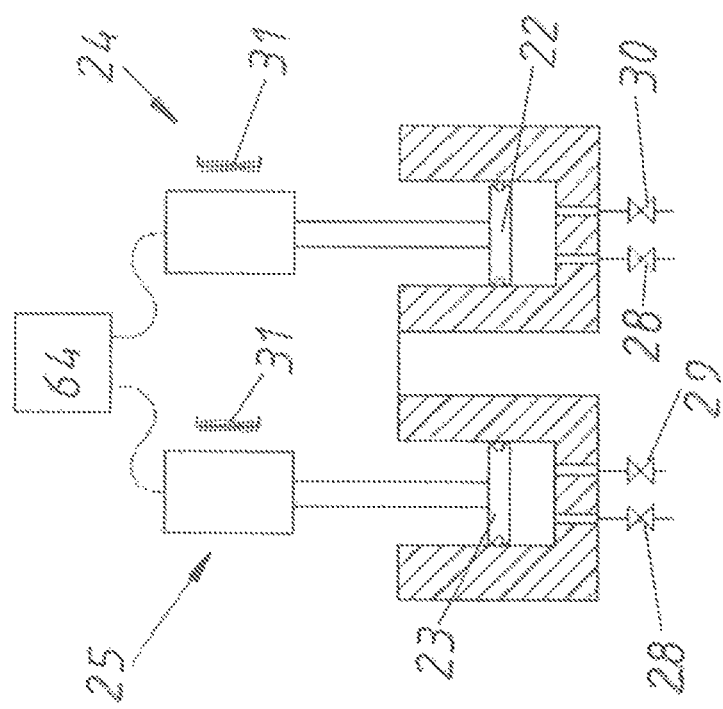

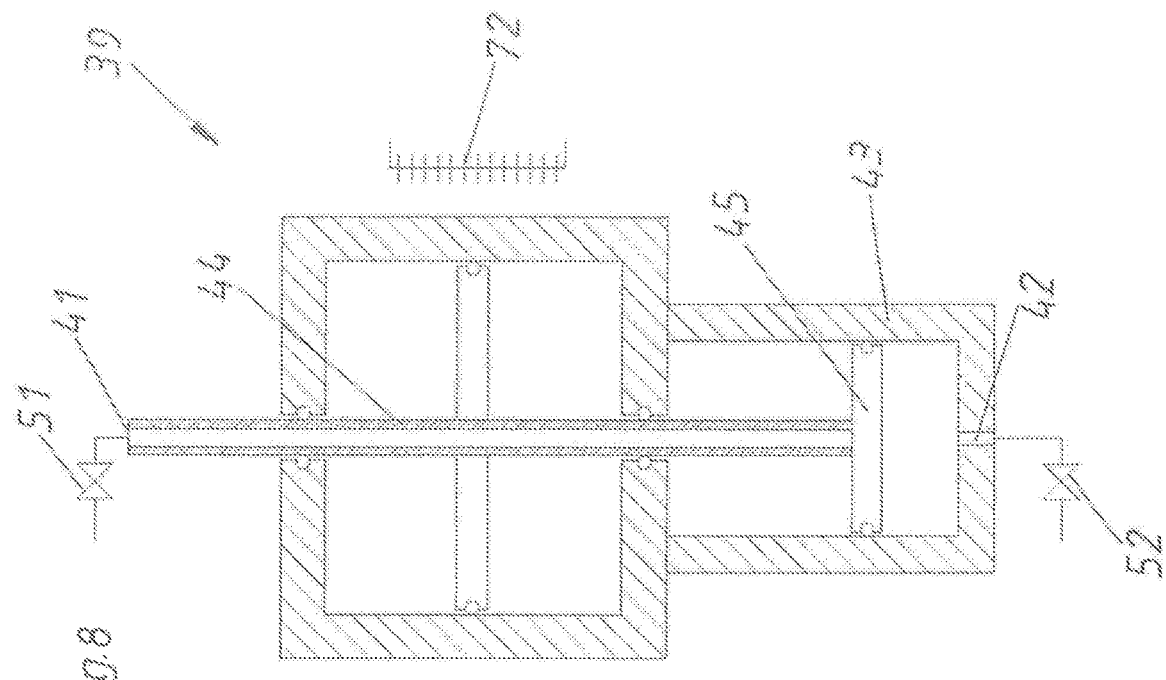
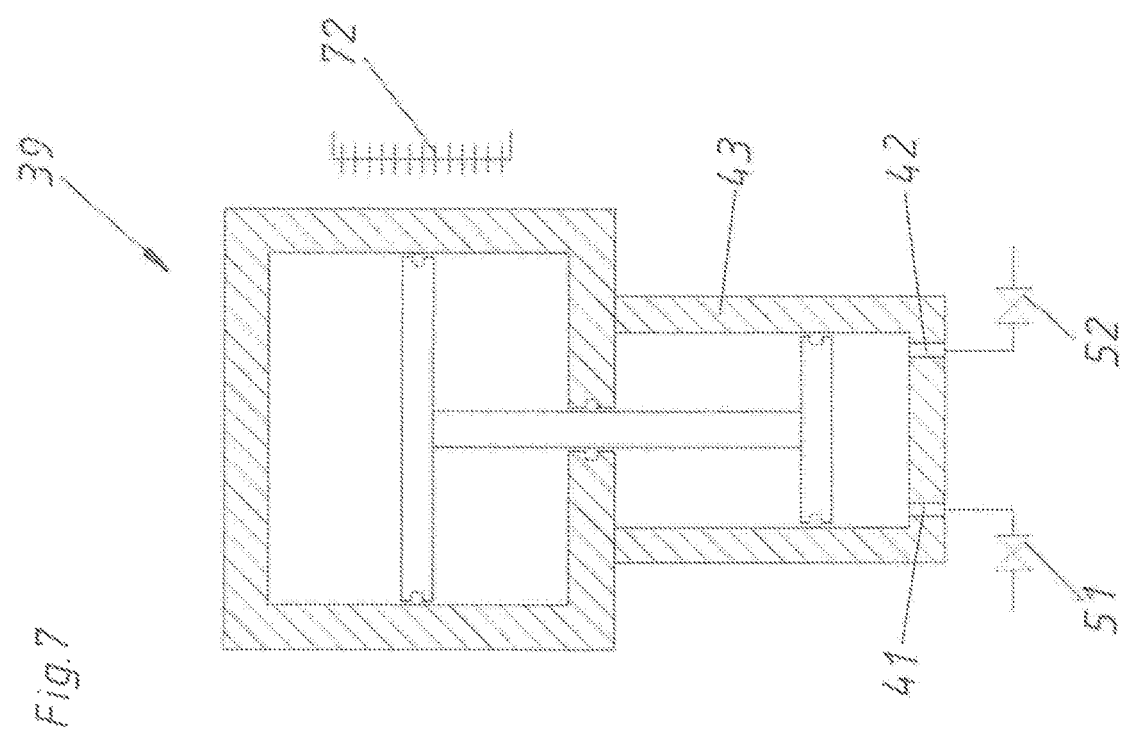

DEVICE CONFIGURED TO INTERMITTENTLY SUPPLY A LIQUID PLASTIC COMPONENT

BACKGROUND OF THE INVENTION

1. Field of the Invention

The invention concerns a device including a source for at least one liquid plastic component, and a metering device.

2. Description of the Related Art

In order to provide a liquid plastic component for constantly sufficiently for a metering device, it is already known to make available two sources which operate alternately intermittently. That involves a high level of structural complexity and expenditure. There is moreover the problem that the point of switching over from one source to the other has to be correctly selected so that no unwanted pressure drop occurs.

SUMMARY OF THE INVENTION

The object of the present invention is to provide a device which is improved over the state of the art and in which those problems are avoided.

Accordingly, it is provided according to the invention that arranged between the source for the at least one liquid plastic component and the metering device is a buffer device having a variable buffer volume and being connected to the source by way of an inlet and to the metering device by way of an outlet. That makes it possible with a single intermittently operating source to make the liquid plastic component available to the metering device without interruption. In that respect, the buffer device ensures that there is always sufficient material available, with an adequate preload pressure. The buffer device itself does not have to operate as a pump but is of a purely passive nature.

The term "intermittently operating source" is used to denote not just a source whose delivery output drops to zero (for example, a piston pump) but also a source whose delivery output is subjected, in particular, to pulsating fluctuations (for example, a gear pump).

By virtue of inevitable frictional losses, it is preferably provided that the preload pressure of the buffer device can be particularly preferably set by way of a preferably pneumatic proportional pressure valve.

Also disclosed is a device for producing foamed plastic parts, in particular, sealing beads, having a device according to the invention.

BRIEF DESCRIPTION OF THE DRAWINGS

Embodiments of the invention are discussed with reference to the Figures in which:

FIG. 1 diagrammatically shows a device for producing foamed plastic parts,

FIG. 2 shows a first embodiment of a piston pump in which the pistons are mechanically coupled in mirror-inverted relationship, FIG. 3 shows a variant of the embodiment of FIG. 2, FIG. 4 shows an embodiment of the invention in which the pistons are mechanically coupled synchronously, FIG. 5 shows an embodiment of the invention in which the pistons are coupled electrically, FIG. 6 shows an embodiment of the invention, wherein one piston pump and another piston pump are respectively alternately in the form of an introduction device and a delivery device, FIG. 7 shows the buffer device in detail, and FIG. 8 shows an alternative variant of the buffer device.

DETAILED DESCRIPTION OF THE INVENTION

FIG. 1 diagrammatically shows, in its entirety, a device 100 for producing foamed plastic parts, in particular, sealing beads. The device 100 in turn has a plurality of essential sub-units.

Such a sub-unit is formed by a device 16 for producing a mixture of at least one gas and at least one liquid plastic component. The device 16 in turn has at least one mixing device 17, an introduction device 19 for the at least one gas, that is connected to the mixing device 17 by way of a first line 18, and a delivery device 21 for the at least one liquid plastic component, that is connected to the mixing device 17 by way of a second line 20. In addition, the device 16 has a container 53 for the plastic component and a gas source 54, in particular, a compressed air generating device. Instead of the container 53, it would also be possible to provide a delivery pump.

In such a device 16, in contrast to the state of the art, it is provided that the introduction device 19 and the delivery device 21 are in the form of piston pumps 25 and 24 having pistons 22 and 23.

The piston 22 of the introduction device 19 (piston pump 25) and the piston 23 of the delivery device 21 (piston pump 24) are mechanically coupled in this example in mirror-inverted relationship by way of a pressure booster 26. That makes it possible to use a drive which operates at a relatively low pressure (for example, pneumatic) as the necessary increase in force is effected by way of the force booster. It is also possible to use inlet valves 27, 28 and outlet valves 29, 30.

As shown in greater detail in FIG. 2, the inlet valves 27, 28 and outlet valves 29, 30 are actuated by a control device 33 matched to the movement of the coupled pistons 22, 23. FIG. 2 also shows a sensor 31 which communicates with the control device 33 by way of a signal line 32 for signal transmission. The sensor 31 serves to determine the position of the pressure booster 26. In that way, the position of the pistons 22, 23 is also determined. The position of the pistons 22, 23 can also be determined directly by way of the sensor 31 (see the further embodiments). In general, it is possible with such a sensor 31 to detect leakage, more specifically if the piston seals between the piston 23 and the cylinder 34 of the introduction device 19, the piston seals between the piston 22 and the cylinder 35 of the delivery device 21 and/or at least one of the valves 27 through 30 are worn. For leakage detection purposes, for example, the inlet valve 28 and the outlet valve 30 of the gas side are closed. Compression of the gas volume between the inlet valve 28 and the outlet valve 30 is effected by the piston 22. If there is a leak, the result is an irregular movement of the pressure booster 26 which is detected by the sensor 31, after compression has occurred. It is also possible to check whether there are irregular gas proportions in the liquid plastic component as, when the inlet valve 27 and the outlet valve 29 are closed, this leads to a movement of the piston 23 as the liquid plastic component is compressible due to the irregular gas proportions therein. That can possibly be compensated by the control device 33.

FIG. 3 shows a single piston pump which simultaneously forms the piston pump 24 for the delivery device 21 and the piston pump 25 for the introduction device 19. This variant does not have a separate pressure booster, rather, a piston forms both the piston 23 of the piston pump 24 and also the piston 22 of the piston pump 25. The system as shown in FIG. 3 also operates mechanically in mirror-inverted relationship. This means that, when gas is discharged by way of the introduction device 19 (shown downwardly), liquid plastic component is introduced into the delivery device 21 and vice versa.

In comparison, FIG. 4 shows a system in which the piston pumps 24 and 25 are mechanically coupled synchronously. In specific terms, the piston 22 of the introduction device 19 and the piston 23 of the delivery device 21 are coupled by way of a coupling mechanism 63 in such a way that, when gas is discharged from the introduction device 19, liquid plastic component is discharged from the delivery device 21 and, when gas passes into the introduction device 19, liquid plastic component is introduced into the delivery device 21.

FIG. 5 shows electronic coupling of the piston pumps 24 and 25. In this case, the movement of the pistons 22 and 23 is controlled by a control device 64 which is connected in signal-conducting relationship with drive devices of the two piston pumps 24 and 25. The pistons 22 and 23 can be moved synchronously or in mirror-inverted relationship. This can be set by way of the control device 64.

FIG. 6 shows a piston pump 25 and a piston pump 24 which respectively alternately form the introduction device 19 or the delivery device 21. An advantage in that respect is that the seals are lubricated alternately on both sides by the liquid plastic component. A change is possible after a predeterminable number of cycles. The change is effected by way of switching devices 65 and 66 which can either be switched over manually; or however, can be preferably regularly switched by way of a control device 67. In the first switching position, the liquid plastic component is conveyed from the container 53 by way of a first line 68 to the piston pump 24 (shown upwardly) while the gas from the gas source 54 is conveyed to the piston pump 25 by way of the second line 69. In that respect, the entire system in the first switching position is the same as in FIGS. 1 and 2. In the second switching position, however, a diversion is implemented. More specifically, in the second switching position, the liquid plastic component is conveyed from the container 53 to the piston pump 25 (shown downwardly) by way of a third line 70 while the gas is conveyed from the gas source 54 to the piston pump 24 by way of a fourth line 71. Accordingly—conversely, relative to the first switching position—in the second switching position, the piston pump 25 forms the delivery device 21 and the piston pump 24 forms the introduction device 19. Depending on the respective switching position then, the liquid plastic component and the gas respectively are further pumped to the mixing device 17 by way of the first line 18 and the second line 20 respectively.

Going back to FIG. 1, a further sub-unit of the device 100 is formed by a device 36 for providing a liquid plastic component, preferably mixed with gas, for a metering device 38. The device 36 has a source 37 for at least one liquid plastic component. Preferably the source 37 is formed by a line which leads away from the mixing device 17. In addition, the device 36 has an intermittently operating forwarding device for the at least one liquid plastic component. The intermittently operating forwarding device is formed by the piston pumps 24, 25 but can also be any other device of any desired configuration, which is suitable for intermittently forwarding the liquid plastic component. The term "intermittently operating source" is used to mean not just a source whose delivery output falls to zero but also a source whose delivery output is subject to severe fluctuations.

The device 36 in addition has a metering device 38, preferably a metering pump, for which the plastic component is provided by the forwarding device. In addition, the device 36 has a buffer device 39 with a variable buffer volume 40, that is arranged between the source 37 for the at least one liquid plastic component and the metering device 38, and by which the liquid plastic component intermittently delivered to the buffer device 39 is always made available in an adequate quantity and with a sufficient preload pressure for the metering device 38. Downstream of the metering device 38, the plastic component passes to a metering valve 60 whereupon the plastic component is discharged directly (see nozzle 61 shown with a broken line)—or as shown in FIG. 1 indirectly by way of a further mixing element 58—by way of the nozzle 61 and foams up by virtue of discharge thereof and the pressure drop that this entails.

In order to permit forwarding of the material that is as uniform as possible, it is preferably provided that the pressure prevailing between the buffer device 39 and the metering device 38 in the liquid plastic component is controllable by the buffer device 39. The liquid plastic component passes by way of an inlet opening 41 from the source 37 into the buffer volume 40 of the buffer device 39. The buffer volume 40 is in turn connected to the metering device 38 by way of an outlet opening 42. In FIG. 1, the inlet opening 41 is provided in a wall of a housing 43 of the buffer device 39. That can equally be seen in FIG. 7. Alternatively, however, it is also possible to provide that the inlet opening 41 is provided in a piston rod 44, connected to a piston 45, of the buffer device 39 (see FIG. 8). In addition, an inlet valve 51 is arranged upstream of the inlet opening and an outlet valve 52 is arranged downstream of the outlet opening 42. A travel sensor 72 can also be provided, with which it is possible to determine at least selected positions of the piston 45 in the housing 43.

It is further provided that a pressure sensor 46 is arranged on the outlet side of the metering device 38. That pressure sensor 46 is connected to a control device 47 by way of a control line 48. The control device 47 controls the buffer device 39 in such a way that the pressure on the inlet side of the metering device 38 tracks the pressure prevailing on the outlet side of the metering device 38. In addition, the control device 47 can be adapted to close both the inlet valve 51 and also the outlet valve 52 and to compress the liquid plastic component in the buffer volume 40. In addition, there can be a sensor (not shown) by which irregular compression of the buffer volume 40 can be detected.

In addition, the buffer device 39 is connected to a device 49 for pressurizing the buffer device 39. That is controllable either by the control device 47 (conduit shown with a broken line) or by an independent control device 50.

In principle, the two devices 16 and 36 are already sufficient for the production of foamed plastic parts in the form of sealing beads. It can, however, additionally preferably be provided that a second plastic component foams up, preferably physically, in parallel with the first plastic component or mixed with the first plastic component to produce the plastic part. Therefore, a further sub-unit of the device 100 is formed by a device 62 for multi-component foaming (see FIG. 1). The device 54 has a container 55 for a second plastic component, from which the second plastic component, preferably mixed with gas, is passed to the mixing element 58 by way of a metering device 56 and a metering valve 57. The second plastic component is mixed with the first plastic component in the mixing element 58. Then, downstream of a further metering valve 59, the mixture is discharged by way of a diagrammatically indicated nozzle 61 whereby the gas contained in the mixture foams out. Expressed in other terms, a pressure drop occurs due to discharge of the material, the gas causes the liquid plastic component to foam up and after hardening of the foamed plastic component, the result is a plastic part provided with pores, for example, in the form of a sealing bead 73.

Blocking valves can equally be provided in the metering valves 57 and/or 60, as shown in FIG. 1 and identified by reference characters 51 and 52, as the inlet and outlet valves.

LIST OF REFERENCE CHARACTERS

16 device
17 mixing device
18 first line
19 introduction device
20 second line
21 delivery device
22 piston
23 piston
24 piston pump
25 piston pump
26 pressure booster
27 inlet valve
28 inlet valve
29 outlet valve
30 outlet valve
31 sensor
32 signal line
33 control device
34 cylinder
35 cylinder
36 device for forwarding a liquid plastic component
37 source
38 metering device
39 buffer device
40 buffer volume
41 inlet opening
42 outlet opening
43 housing
44 piston rod
45 piston
46 pressure sensor
47 control device
48 control line
49 pressurizing device
50 control device
51 inlet valve
52 outlet valve
53 container for plastic component
54 gas source
55 container for second plastic component
56 mixing device
57 metering valve
58 mixing element
59 metering valve
60 metering valve
61 nozzle
62 device for multi-component foaming
63 coupling mechanism
64 control device
65 switching device
66 switching device
67 control device
68 first line
69 second line
70 third line
71 fourth line
72 travel sensor
73 sealing bead
100 device for production of foamed plastic parts

The invention claimed is:

1. A device for producing foamed plastic parts, the device comprising:
    a container or a delivery pump for a liquid plastic component;
    a gas source;
    at least one mixing device;
    an introduction device for introducing gas from the gas source to the at least one mixing device;
    a delivery device for delivering the liquid plastic component from the container or the delivery pump to the at least one mixing device;
    a source for the liquid plastic component mixed with the gas, the source for the liquid plastic component mixed with the gas being defined by a line which leads away from the at least one mixing device;
    a metering device;
    a buffer device having a variable buffer volume; and
    a nozzle,
    wherein:
    the gas source is a compressed air generating device;
    the source for the liquid plastic component mixed with the gas is configured to intermittently supply the liquid plastic component mixed with the gas for the metering device;
    the buffer device is between the source for the liquid plastic component mixed with the gas and the metering device;
    the buffer device is connected to the source for the liquid plastic component mixed with the gas by an inlet opening;
    the buffer device is connected to the metering device by an outlet opening;
    the metering device is between the buffer device and the nozzle;
    the nozzle is downstream of the metering device and is configured to discharge the liquid plastic component mixed with the gas; and
    the metering device is a metering pump.

2. The device as set forth in claim 1, wherein a pressure between the buffer device and the metering device in the liquid plastic component mixed with the gas is controllable by the buffer device.

3. The device as set forth in claim 1, further comprising a pressure sensor is positioned on an outlet side of the metering device.

4. The device as set forth in claim 1, wherein the inlet opening or the outlet opening is defined in a wall of a housing of the buffer device.

5. The device as set forth in claim 1, wherein the inlet opening or the outlet opening is defined in a piston rod of the buffer device, the piston rod being connected to a piston.

6. The device as set forth in claim 1, wherein the buffer device is connected to a device for pressurizing the buffer device.

7. The device as set forth in claim 1, wherein the buffer device has a piston displaceable in a housing.

8. The device as set forth in claim 1, further comprising:
an inlet valve upstream of the inlet opening; and
an outlet valve downstream of the outlet opening.

9. The device as set forth in claim 8, further comprising:
a sensor configured to detect an irregular reduction in size of the variable buffer volume or a compression of the variable buffer volume.

10. The device as set forth in claim 1, wherein the foamed plastic parts are sealing beads.

11. The device as set forth in claim 6, wherein the device for pressurizing the buffer device is pneumatic.

12. The device as set forth in claim 7, further comprising a travel sensor for determining positions of the piston in the housing.

* * * * *